United States Patent
Fukuda et al.

(10) Patent No.: US 6,463,350 B2
(45) Date of Patent: *Oct. 8, 2002

(54) PRODUCTION SYSTEM FOR MANUFACTURING SEMICONDUCTOR DEVICES BY LOT

(75) Inventors: Etsuo Fukuda, Yokohama (JP); Hiroshi Nanami, Chigasaki (JP); Hidehiro Okutani, Yokohama (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/084,308

(22) Filed: May 26, 1998

(65) Prior Publication Data

US 2002/0013632 A1 Jan. 31, 2002

(30) Foreign Application Priority Data

May 26, 1997 (JP) ............................................. 9-134839

(51) Int. Cl.$^7$ .............................................. G06F 19/00
(52) U.S. Cl. ......................................... 700/121; 700/83
(58) Field of Search ................................. 700/121, 228, 700/112, 229, 116, 113, 83, 17, 180, 100, 99

(56) References Cited

U.S. PATENT DOCUMENTS

| | | | | |
|---|---|---|---|---|
| 4,802,094 A | * | 1/1989 | Nakamura et al. ........... | 700/115 |
| 4,873,623 A | * | 10/1989 | Iane et al. ..................... | 700/83 |
| 4,930,086 A | * | 5/1990 | Fukasawa .................... | 700/116 |
| 5,226,118 A | * | 7/1993 | Baker et al. ................. | 345/833 |
| 5,295,242 A | * | 3/1994 | Mashruwala et al. ........ | 345/853 |
| 5,367,624 A | * | 11/1994 | Cooper ........................ | 345/357 |
| 5,432,702 A | * | 7/1995 | Barnett ........................ | 700/116 |
| 5,444,632 A | * | 8/1995 | Kline et al. .................. | 700/100 |
| 5,446,671 A | * | 8/1995 | Weaver et al. ............... | 700/100 |
| 5,576,946 A | * | 11/1996 | Bender et al. ................. | 700/17 |
| 5,591,299 A | * | 1/1997 | Seaton et al. ............... | 700/121 |
| 5,740,053 A | * | 4/1998 | Iwama ........................ | 700/121 |
| 5,740,429 A | * | 4/1998 | Want et al. .................. | 707/104 |
| 5,751,581 A | * | 5/1998 | Tau et al. .................... | 700/115 |
| 5,943,484 A | * | 8/1999 | Milne et al. ................. | 700/100 |
| 5,980,591 A | * | 11/1999 | Akimoto et al. ........... | 29/25.01 |
| 6,000,830 A | * | 12/1999 | Asano et al. ............... | 700/121 |
| 6,128,588 A | * | 10/2000 | Chacon ......................... | 703/6 |
| 6,131,052 A | * | 10/2000 | Ban et al. ................... | 700/121 |

* cited by examiner

*Primary Examiner*—Thomas Black
*Assistant Examiner*—Edward F. Gain, Jr.
(74) *Attorney, Agent, or Firm*—Oblon, Spivak, McClelland, Maier & Neustadt, PC.

(57) ABSTRACT

A production system has a plurality of production apparatuses, a conveyer which conveys to each production apparatus at each lot, a lot management computer which controls the degree of progress of the production process in each lot, apparatus management computers which control each of production apparatuses, and an intensive management computer which detects the degree of progress of the production process in each lot and operating state of each production apparatus. User interface sections are connected to the apparatus management computer and the intensive management computer, respectively. The user interface sections comprise display apparatuses, respectively. In the screen of the display apparatuses, operating state of each production apparatus and the degree of progress of the production process of the lot in each production apparatus are displayed. In the screen of the display apparatus of the user interface section, operating state of the corresponding production apparatus and the degree of progress of the production process of the lot in the corresponding production apparatus is displayed.

22 Claims, 10 Drawing Sheets

FIG.4A OPERATION
FIG.4B ⇨ WAIT
FIG.4C ARRANGEMENT
FIG.4D OUT OF ORDER
FIG.4E ⇨MAINTENANCE
FIG.4F POWER ON
FIG.4G SHUTDOWN
FIG.4H LEND

| OPERATION | ABC11 |
|---|---|

D12

LOT INFORMATION TO BE IN TREATMENT

| PRODUCT NAME | PRODUCT NUMBER | NUMBER OF WAFERS | LOCATION | STEP NAME | PROCESS NAME | WAITING TIME |
|---|---|---|---|---|---|---|
| ABC11 | 11 | 24 | P12 | Q23 | R45 | 0 |

D13

LOT INFORMATION TO BE IN WAITING

| | PRODUCT NAME | PRODUCT NUMBER | NUMBER OF WAFERS | LOCATION | STEP NAME | PROCESS NAME | WAITING TIME |
|---|---|---|---|---|---|---|---|
| ☆ | ABC12 | 12 | 24 | P12 | Q24 | R46 | 4 |
| ☆ | ABC13 | 13 | 24 | P12 | Q25 | R47 | 6 |
| + | H11 | 911 | | | HQ11 | HR11 | 8 |
| + | H12 | 912 | | | HQ12 | HR12 | 9 |
| ☆ | ABC14 | 14 | 24 | P12 | Q26 | R48 | 10 |

D11

| OPERATION | ABC11 | ⇧WAIT | ABC51 | WAIT ▨ | ABC52 |
|---|---|---|---|---|---|

D12

LOT INFORMATION TO BE IN TREATMENT

| PRODUCT NAME | PRODUCT NUMBER | NUMBER OF WAFERS | LOCATION | STEP NAME | PROCESS NAME | WAITING TIME |
|---|---|---|---|---|---|---|
| ABC11 | 11 | 24 | P12 | Q23 | R45 | 0 |

D13

LOT INFORMATION TO BE IN WAITING

| | PRODUCT NAME | PRODUCT NUMBER | NUMBER OF WAFERS | LOCATION | STEP NAME | PROCESS NAME | WAITING TIME |
|---|---|---|---|---|---|---|---|
| ☆ | ABC12 | 12 | 24 | P12 | Q24 | R46 | 4 |
| ☆ | ABC13 | 13 | 24 | P12 | Q25 | R47 | 6 |
| + | H11 | 911 | | | HQ11 | HR11 | 8 |
| + | H12 | 912 | | | HQ12 | HR12 | 9 |
| ☆ | ABC14 | 14 | 24 | P12 | Q26 | R48 | 10 |

W2 — OPERATION | ABC11  } D11

LOT INFORMATION TO BE IN TREATMENT

| PRODUCT NAME | PRODUCT NUMBER | NUMBER OF WAFERS | LOCATION | STEP NAME | PROCESS NAME | WAITING TIME |
|---|---|---|---|---|---|---|
| ABC11 | 11 | 24 | P12 | Q23 | R45 | 0 |

} D12

LOT INFORMATION TO BE IN WAITING

| | PRODUCT NAME | PRODUCT NUMBER | NUMBER OF WAFERS | LOCATION | STEP NAME | PROCESS NAME | WAITING TIME |
|---|---|---|---|---|---|---|---|
| ☆ | ABC12 | 12 | 24 | P12 | Q24 | R46 | 4 |
| ☆ | ABC13 | 13 | 24 | P12 | Q25 | R47 | 6 |
| + | H11 | 911 | | | HQ11 | HR11 | 8 |
| + | H12 | 912 | | | HQ12 | HR12 | 9 |
| ☆ | ABC14 | 14 | 24 | P12 | Q26 | R48 | 10 |

| APPARATUS NAME | INFORMATION WAITING TREATMENT |
|---|---|
| APPARATUS 1 | LOT A<br>LOT B |
| APPARATUS 2 | LOT C<br>LOT D<br>LOT E |
| ⋮ | ⋮ |

FIG. 11

| APPARATUS NAME | STATE | LOT TO BE IN TREATMENT |
|---|---|---|
| APPARATUS 1 | IN TREATMENT | LOT A |
| APPARATUS 2 | EMPTY | ⋮ |
| ⋮ | ⋮ | ⋮ |

FIG. 12

PRODUCTION SYSTEM FOR MANUFACTURING SEMICONDUCTOR DEVICES BY LOT

BACKGROUND OF THE INVENTION

1. Field of the Invention

The present invention relates generally to a production system which produces objects, e.g. semiconductor devices, at each of lots which is composed of a plurality of semiconductor wafers. More specifically, the invention is intended for a system which can confirm production processes of each lot and operating state of the production apparatuses on the display.

2. Related Background Art

In semiconductor production lines, semiconductor devices are produced at each of lots which is composed of a plurality of semiconductor wafers. A semiconductor production system shown in FIG. 10 comprises a conveyer 10 which conveys each lot to each production apparatus sequentially, apparatus management computers 12 which control production apparatuses 11 installed on production lines, and a lot management computer 13 which controls production processes of each lot. The apparatus management computers 12 are generally provided with correspondence to production apparatuses 11, respectively; however, depending on the situation, there is a case in which only one of the apparatus management computer 12 controls a plurality of the production apparatuses.

Figure 10:
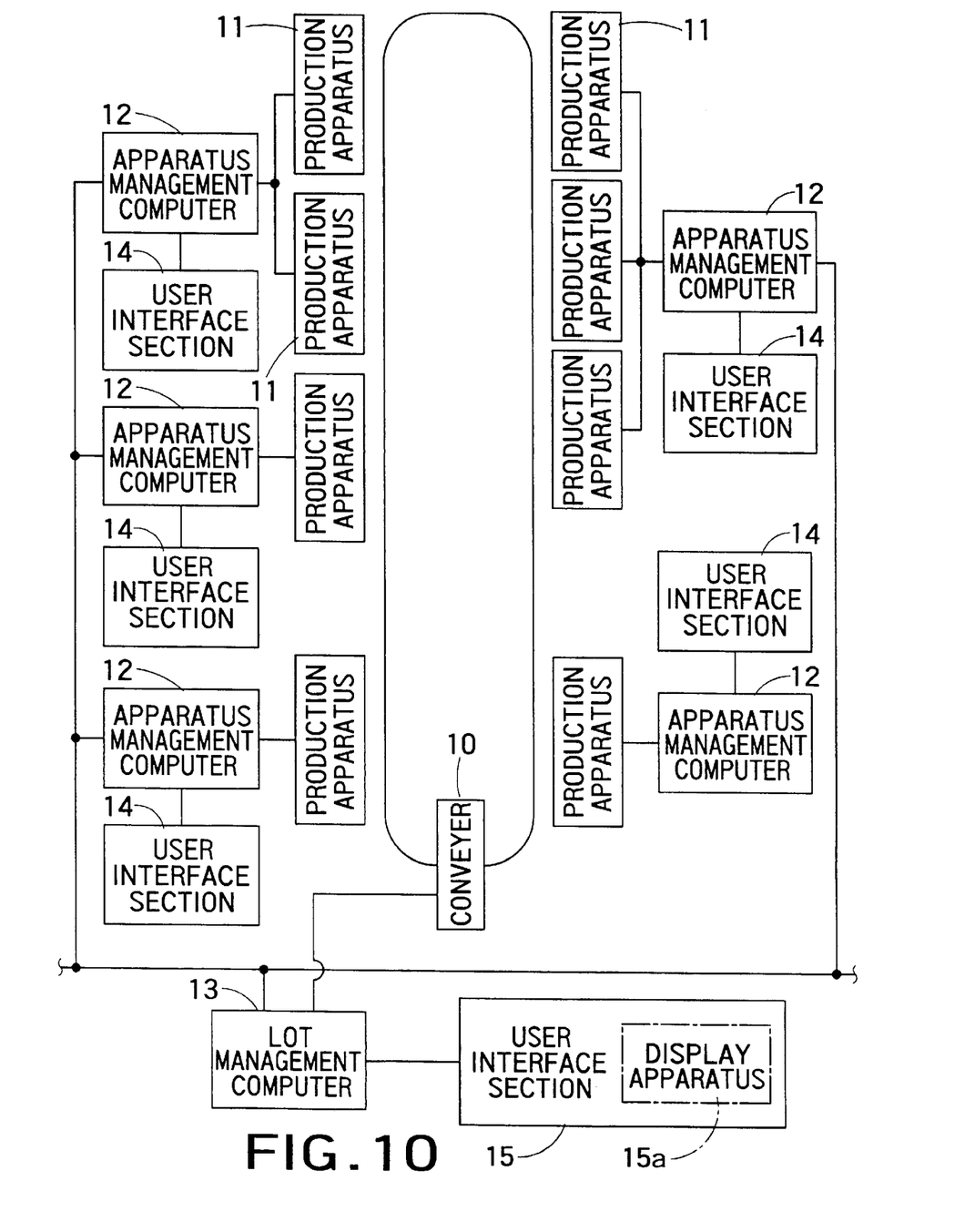
FIG. 10 is a diagram showing a configuration of a conventional semiconductor production system.

User interface sections 14 and 15 are connected to the apparatus management computers 12 and the lot management computer 13, respectively. A display apparatus and an input apparatus (keyboard) which are not shown are provided with the user interface sections 14 and 15, respectively. The user interface section 14 performs detection of operating states of each production apparatus 11, i.e. the state to be in the production, the state to be in maintenance, and the state to be out of order, storing of the receipt for the production (the condition of the production process) in each production apparatus 11, setting of the parameters for the production, and so on. The degree of progress of the production process in each lot is displayed in the display apparatus of the user interface section 15.

Figure 11:
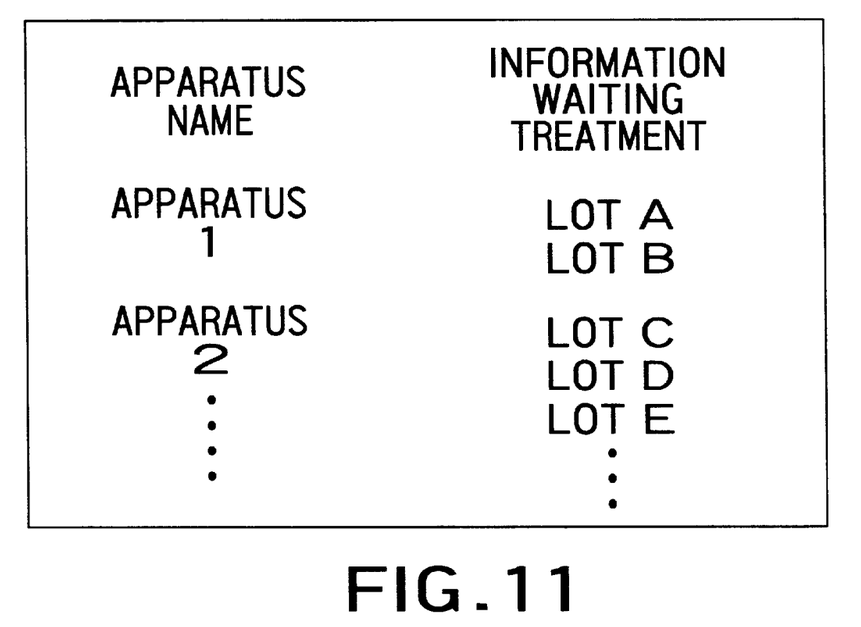
FIG. 11 is a diagram showing an example of the contents displayed in the display apparatus of the user interface section.

FIG. 11 is a diagram showing an example of the contents displayed to the display apparatus of the user interface section 15. The name of all of the production apparatuses 11 installed on the production lines and the name of the lots waiting the treatment in each of the production apparatuses 11 are displayed.

Figure 12:
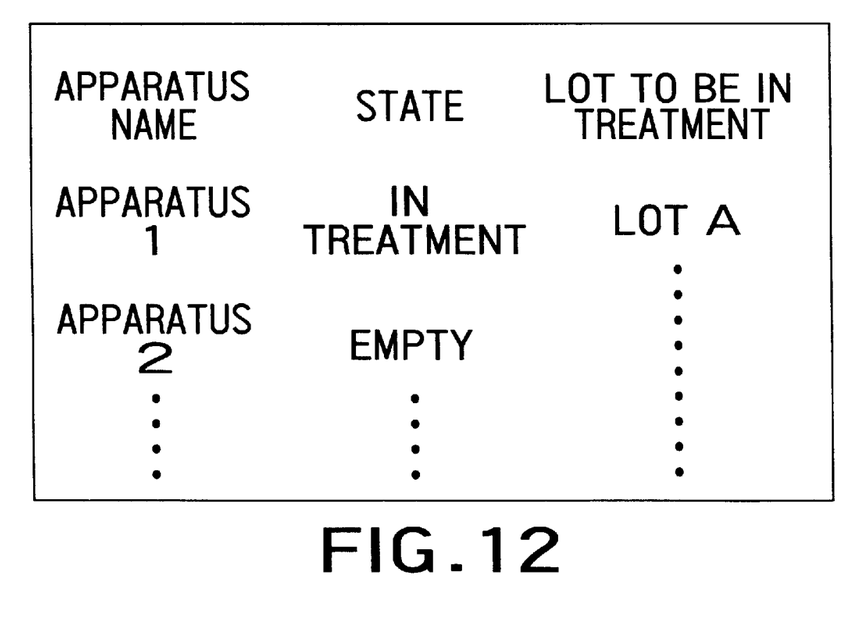
FIG. 12 is a diagram showing an example of the contents displayed to the display apparatus of the user interface section.

On the other hand, FIG. 12 is a diagram showing an example of the contents displayed in the display apparatus of the user interface section 14. Operating state of the corresponding production apparatus 11 is displayed on the screen. More specifically, information related to the lot that the production apparatus 11 is being treated is displayed on the screen.

As above described, the conventional semiconductor system has displayed the degree of progress of the production process and operating state of each production apparatus by using the respective user interface section. Accordingly, it was impossible to simultaneously confirm information concerning the degree of progress of the production process and operating state of each production apparatus on the same screen.

However, in case of producing a semiconductor apparatus, it is necessary for the operator to simultaneously confirm both of the degree of progress of the production process in each lot and operating state of each production apparatus. Accordingly, in case these pieces of information are given by the individual user interface section as the conventional system, the burden of the operators becomes large.

SUMMARY OF THE INVENTION

It is therefore an object of the present invention to provide a production system which can simultaneously, easily and quickly confirm the state of the lots waiting for the treatment in each production apparatus and operating state of each production apparatus.

The present invention provides a production system comprising a plurality of production apparatuses for performing production steps and treatments in accordance with each lot, the production system conveying each lot to said production apparatuses sequentially and performing production of objects, comprising:

a display control apparatus for allowing displaying information related to the state of each lot waiting for the treatment and information related to operating state on the same screen of a display apparatus.

According to the present invention, because the operator can confirm information related to the state of the lots waiting for the treatment in each production apparatus and information related to operating state of each production apparatus on the same screen, the operator does not have to watch a plurality of monitor screens set at different locations from each other at the same time. Accordingly, the operator can work efficiently.

Further, because the operator can grasp present state of the production process in real time, it can quickly keep up with various situations, it is possible to shorten a term of production, and the operator can deal quickly with an unexpected situation. Accordingly, it is possible to prevent the occurrence of an accident and so on. Further, by displaying the state of the lots waiting for the treatment and operating state of the production apparatuses with images and letters, the operator can visually grasp these states; accordingly, it is possible to decrease an oversight and a misunderstanding of the operator.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENTS

Referring now to the accompanying drawings, a preferred embodiment of the production system according to the present invention will be described in detail below. The production system operates to form a semiconductor circuit on a semiconductor wafer at each lot which is composed of a plurality of semiconductor wafers.

Figure 1:
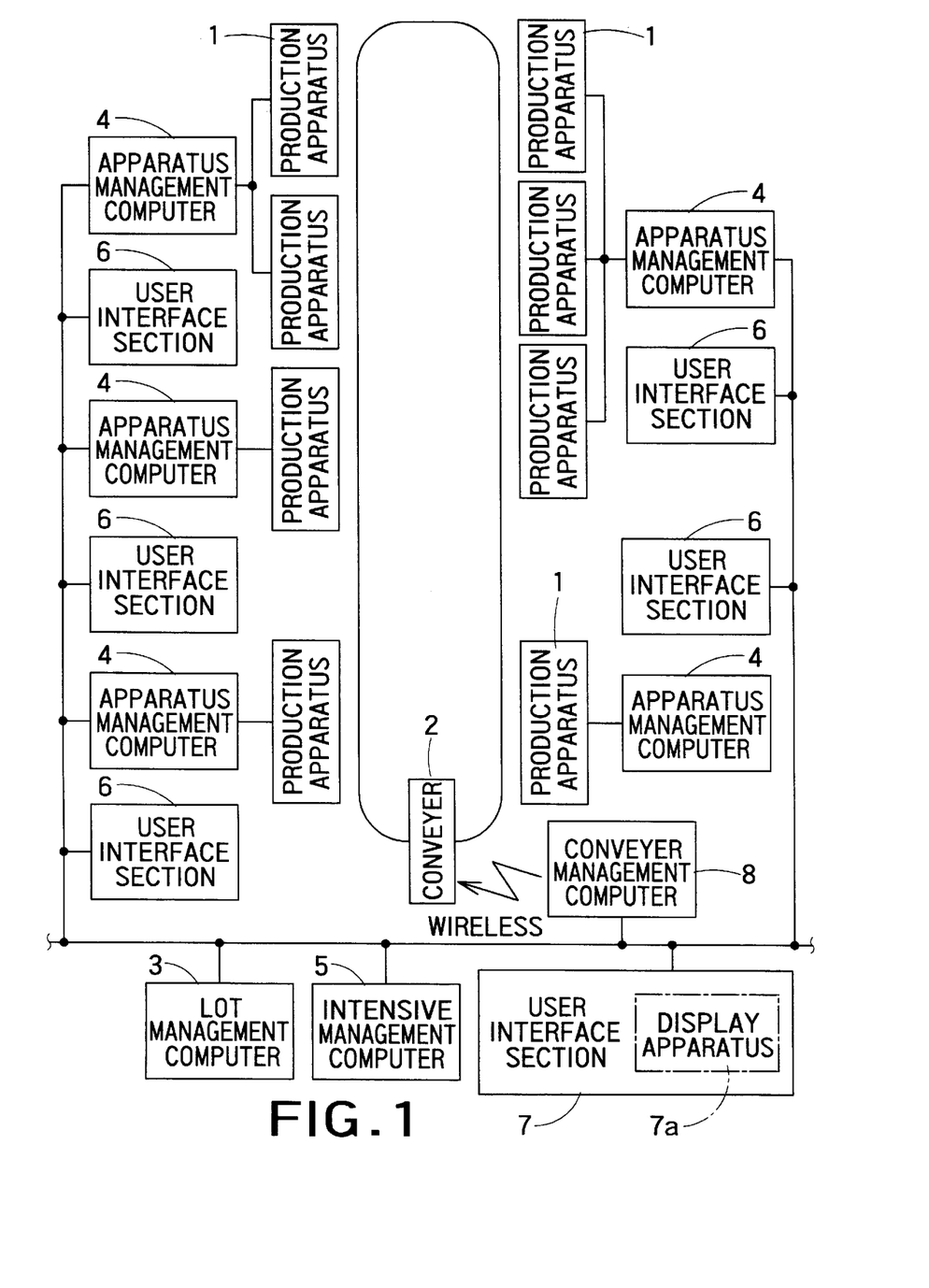
FIG. 1 is a block diagram of a preferred embodiment of a production system according to the present invention.

FIG. 1 is a block diagram of the production system according to the present invention. The production system comprises a plurality of production apparatuses 1 which perform prescribed production processes, respectively, a conveyer which conveys each lot to each production apparatus 1 sequentially, a lot management computer 3 which controls the degree of progress of the production process in each lot, apparatus management computers 4 which control the treatment and operation in each production apparatus, and an intensive management computer 5 which detects operating state of each production apparatus 1.

The production system shown in FIG. 1 comprises a plurality of the apparatus management computers 4. Depending on the situation, there are a case in which at least one of the apparatus management computer 4 controls only one of the production apparatuses 1 and a case in which at least one of the apparatus management computers controls a plurality of the production apparatuses 1.

User interface sections 6 and 7 are provided with locations adjacent to the apparatus management computers 4 and the intensive management computer 5, respectively. The user interface sections 6 and 7 comprise display apparatuses, respectively. The display apparatuses display managing information of the corresponding computer. Detail contents displayed to the display apparatuses will be described later.

The conveyer 2 is controlled wirelessly by means of a conveyer management computer 8. The lot management computer 3, the apparatus management computer 4, the intensive management computer 5, the user interface sections 6 and 7, and the conveyer management computer 8 are connected via local area network to each other.

The lot management computer 3, the apparatus management computer 4 and the intensive management computer 5 operate based on the same kind of an operating system, e.g. UNIX, and the user interface sections 6 and 7 operate different kind of the operating system, e.g. Windows. These computers transmit and receive data based on the common protocol, e.g. TCP/IP and ORB (Object Request Broker).

The lot management computer 3 controls the state of the lots waiting for the treatment (queue of the lots) and the detailed information of each lot, e.g. the name of kind of the lot, the lot number, the number of the wafers composing the lot, the treatment condition, the waiting time and so on. Information showing what the treatment in the production apparatus 1 has finished is included in information the lot management computer 3 controls.

The apparatus management computers 4 controls operating state of the corresponding production apparatus 1, which is, e.g. in treatment, in maintenance, out of order and so on. The intensive management computer 5 reads out information which is controlled by the lot management computer 3 and the apparatus management computer 4, based on the procedure prescribed by ORB and so on. After that, the intensive management computer 5 revises the information which is read out when a need arises, and then displays information to the display apparatus 7a of the user interface section 7.

Figure 2:
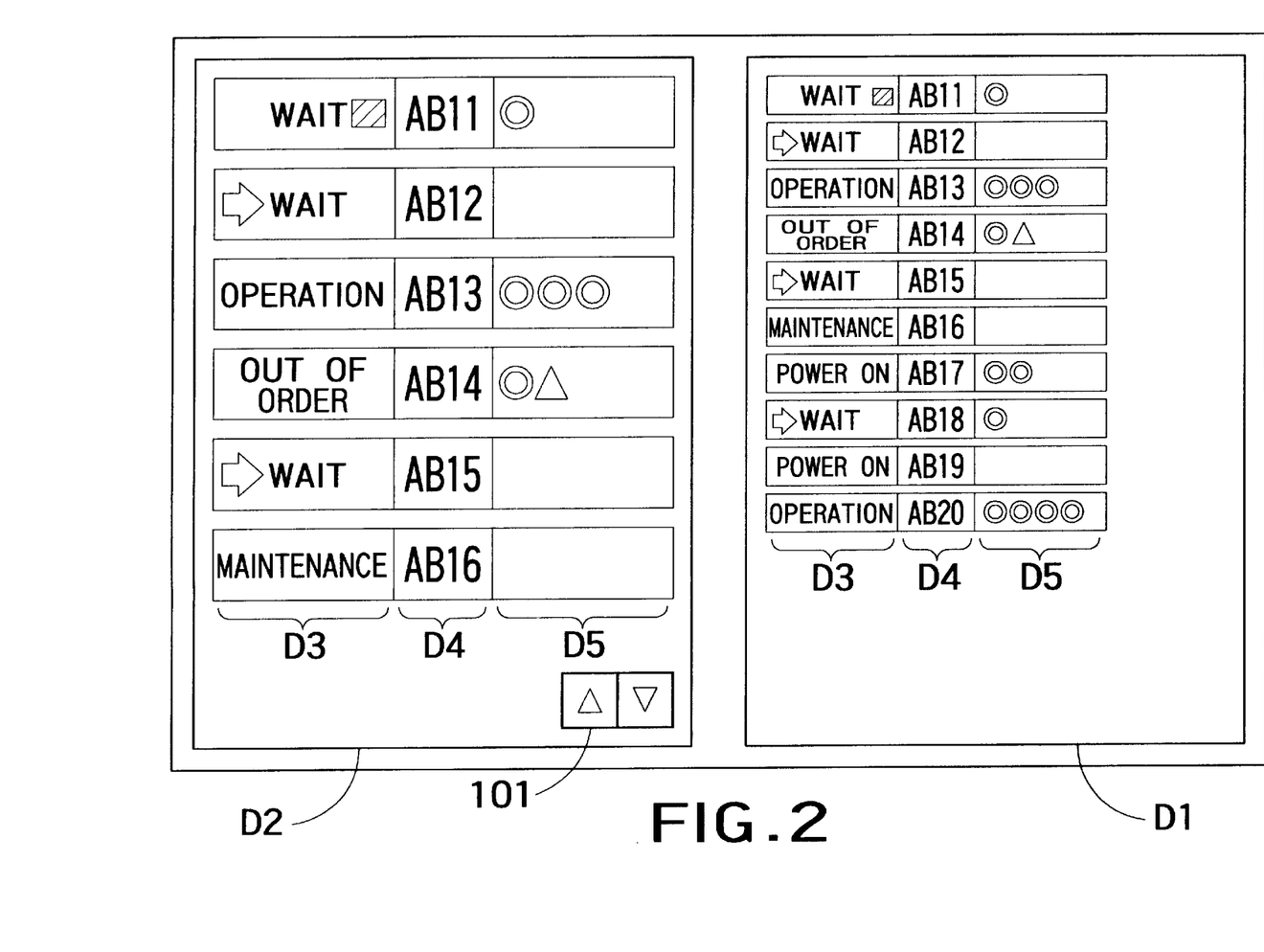
FIG. 2 is a diagram showing an example of a screen of a display apparatus in a user interface section.

FIG. 2 is a diagram showing an example of the screen of the display apparatus 7a in the user interface section 7. Two display regions are provided on the screen. A display region D1 on the right side displays the degree of progress of the production process in each lot and operating state of the production apparatuses 1. Because operating states of all of the production apparatuses 1 are displayed in the display region D1, in case there are many production apparatuses 1 in the system, the letters are displayed small; consequentially, it becomes difficult to recognize the letters. Therefore, at least one portion of the displayed contents in the display region D1 is displayed with magnification in a display region D2 on the left side of the screen.

A scroll button 101 is displayed on the under side in the display region D2. When the operator clicks this button 101 with a mouse and so on, it is possible to scroll the displayed contents up and down.

In the display regions D1 and D2, information showing operating state of each production apparatus 1 is displayed on one line, respectively. For example, on first line shown in FIG. 2, information related to the production apparatus 1 is displayed. Information on each line is divided into three display regions D3, D4 and D5.

In the display region D3, as described in detail later, operating state and so on are displayed. In the display region D4, the name of each production apparatus 1 is displayed. In the display region D5, the queue of the lots is displayed. The double circular marks shown in FIG. 2 express the lots waiting for the treatment and the triangular marks express the treatment of the maintenance. Because the double circular marks are displayed at each lot waiting for the treatment, it is possible to understand the number of the lots waiting for the treatment by the number of the marks.

Figure 3:
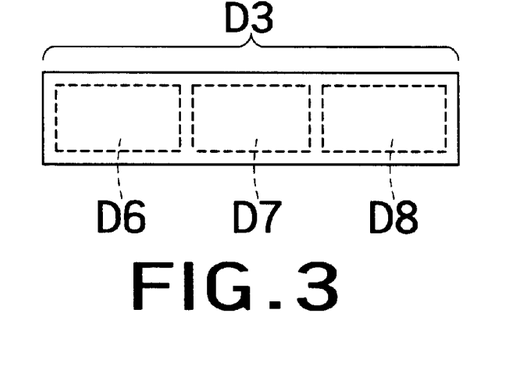
FIG. 3 is a diagram which explains detailed contents displayed in the display region.
Figure 4A:
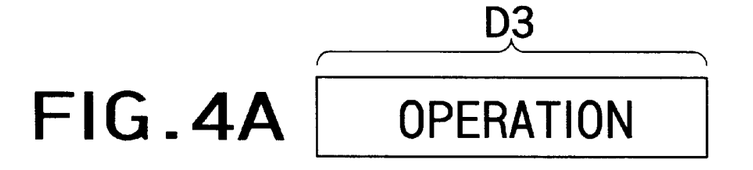
FIG. 4 is a diagram showing a concrete example of the screen of the display region.
Figure 4B:
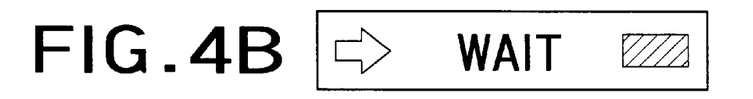
Figure 4C:
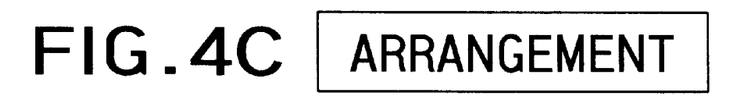
Figure 4D:
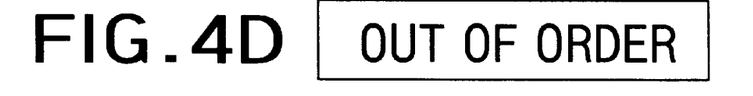
Figure 4E:
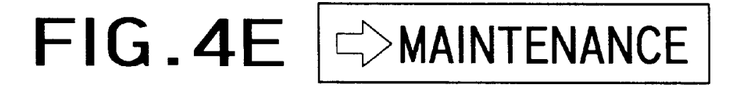
Figure 4F:
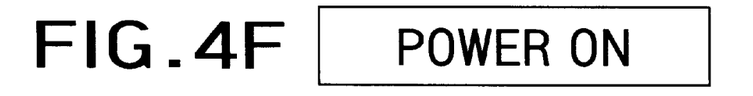
Figure 4G:
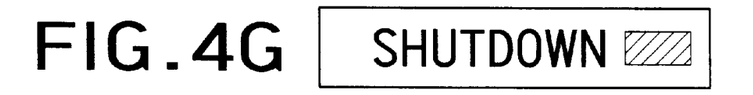
Figure 4H:
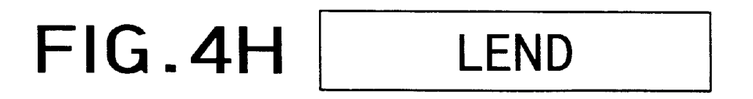

FIG. 3 is a diagram which explains detail contents displayed in the display region D3. As shown in FIG. 3, the display region D3 is divided into three regions D6, D7 and D8. In the display region D6, information showing whether or not it is possible to load the lot in the production apparatus 1 is displayed. In the display region D7, operating state of the production apparatus 1 is displayed. In the display region D8, information showing whether or not the lot had been taken out (unloaded) from the production apparatus 1 is displayed. For example, in case the lot has been unloaded, the display region D7 is displayed with a color which calls the operator's attention, and in another case, nothing is displayed in the display region D7.

FIG. 4 is a diagram showing a concrete example of the screen of the display region D3. In the display region D6, an arrow is displayed when it is possible to load the lot, and nothing is displayed when it is impossible to load the lot. In the display region D7, in accordance with the production apparatus 1, any one among eight kinds of FIG. 4(a) through FIG. 4(h) is displayed. The "operation" expresses a state to be in operation. The "wait" expresses a state in which the production apparatus 1 has not yet operated due to conveying of the lot and so on. The "arrangement" expresses a state to be in preparation. The "out of order" expresses a state in which any trouble has occurred. The "maintenance" expresses a state to be in maintenance. The "power on" expresses a state in turning on the power supply of the production apparatus 1. The "shutdown" expresses a state to be in turning off the power supply of the production apparatus 1. The "lend" expresses a state to be in lending the production apparatus 1 because of the experiment and so on.

Figure 5:
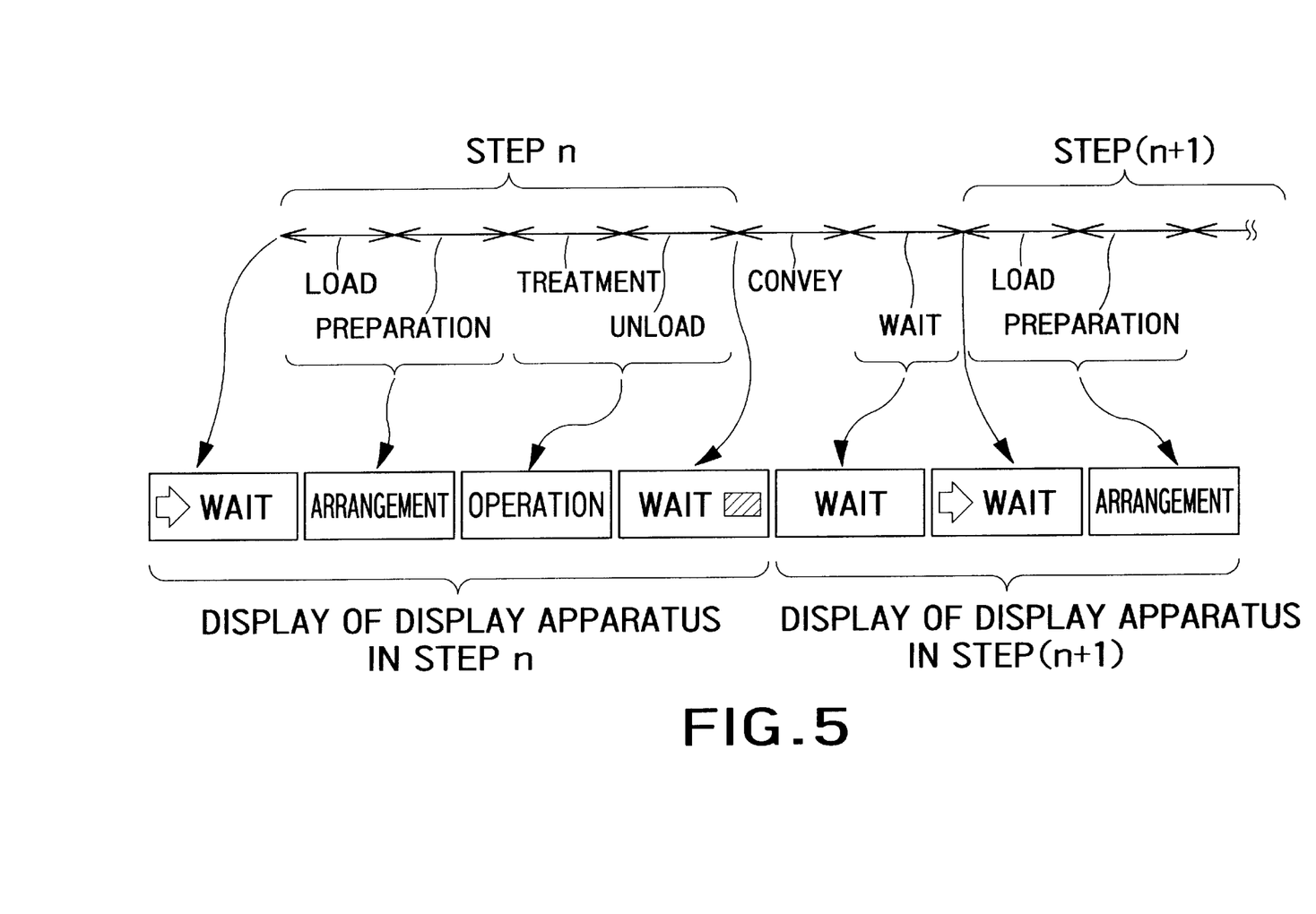
FIG. 5 is a diagram showing an example displayed to each display apparatus in the production apparatuses.

For example, with reference to FIG. 5, an example which performs production steps n and (n+1) will be described as follows. FIG. 5 is a diagram showing an example displayed in each display apparatus 7a in the production apparatuses 1 which perform the production steps n and (n+1), respectively.

When a lot is conveyed to the production apparatus 1 which performs the production step n, and then, it becomes possible to load the lot to the production apparatus 1, the arrow is displayed in the display region D6. After the lot had been loaded to the production apparatus 1, until the preparation beginning the treatment in the production apparatus 1 is ready, the term "arrangement" is displayed in the display region D7. After that, until the treatment in the production apparatus 1 ends, the term "operation" is displayed. After that, when the lot has been taken out (unloaded) from the production apparatus 1, the display region D8 changes to pink color in order to inform what the lot has been unloaded. After that, while the lot is conveyed to the production apparatus 1 which performs the next production step, the term "wait" is displayed in the display region D7 of the display apparatus in the production step (n+1).

Thus, the double circular mark and the triangular mark showing the state waiting for the treatment are displayed in the display region D5 in the screen of the display apparatus 7a, and operating state of each production apparatus 1 is displayed in detail in the display region D3. Therefore, the operator can correctly grasp the state of each lot waiting for the treatment and operating state of each production apparatus 1.

In case a carrier sensor is fitted up the conveyer 2 conveying the lot, the intensive management computer 5 detects whether or not the lot has been unloaded based on a signal outputted from the sensor. The carrier sensor is fitted up the under part of the stand of the conveyer 2, and sends a signal showing whether or not the lot has been put on the stand, to the apparatus management computer 4. When the signal showing what the lot has been put on the conveyer 2 is sent to the apparatus management computer 4, the apparatus management computer 4 determines the lot has been unloaded.

On the other hand, in case the carrier sensor is not fitted up the conveyer 2, when the apparatus management computer 4 had received a signal which informs the end of the treatment, its signal being transmitted from the production apparatus 1, and being also transmitted to the intensive management computer 5, the intensive management computer 5 is informed that the lot has been unloaded.

Figure 6:
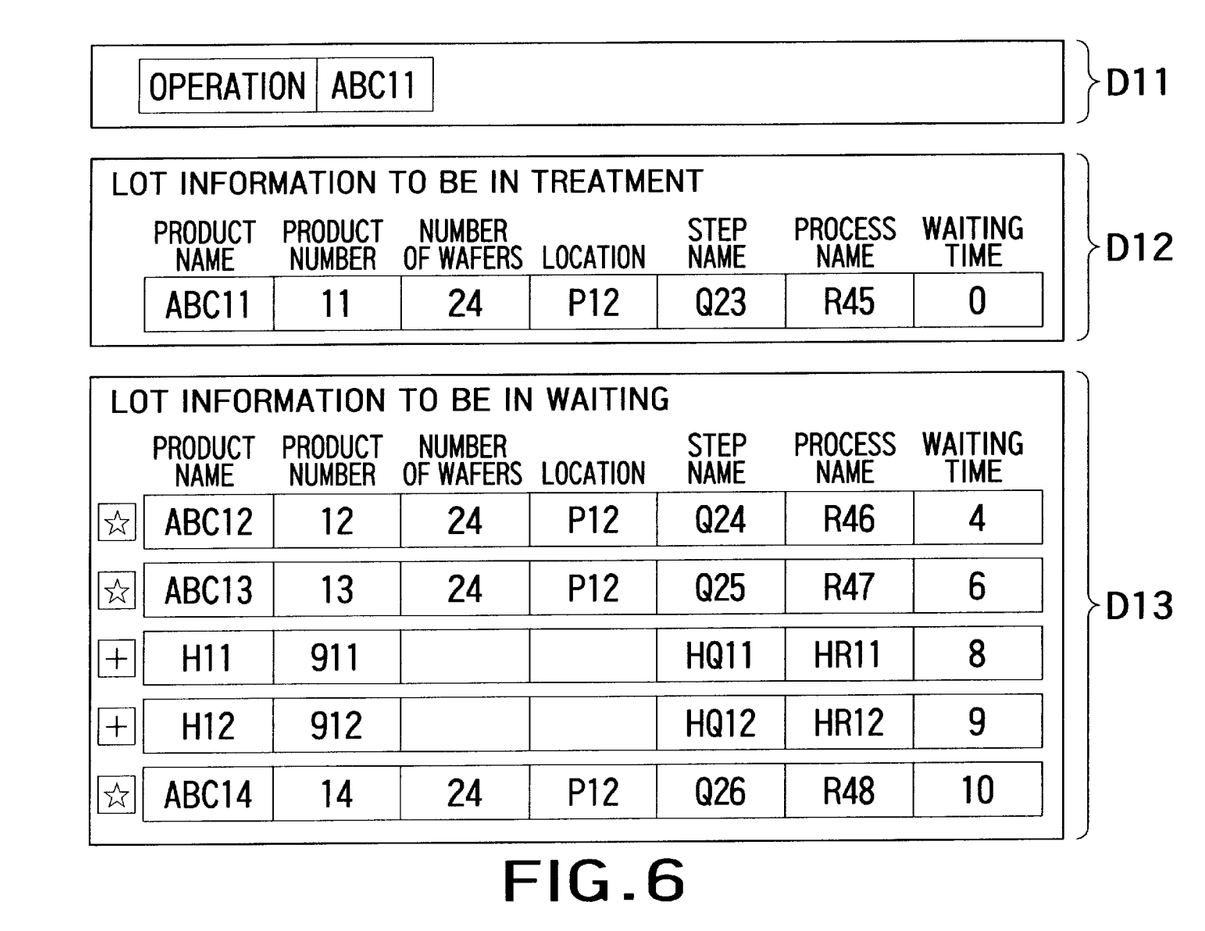
FIG. 6 is a diagram showing an example of the screen of the display apparatus in the user interface section connected to each production apparatus.
Figure 7:
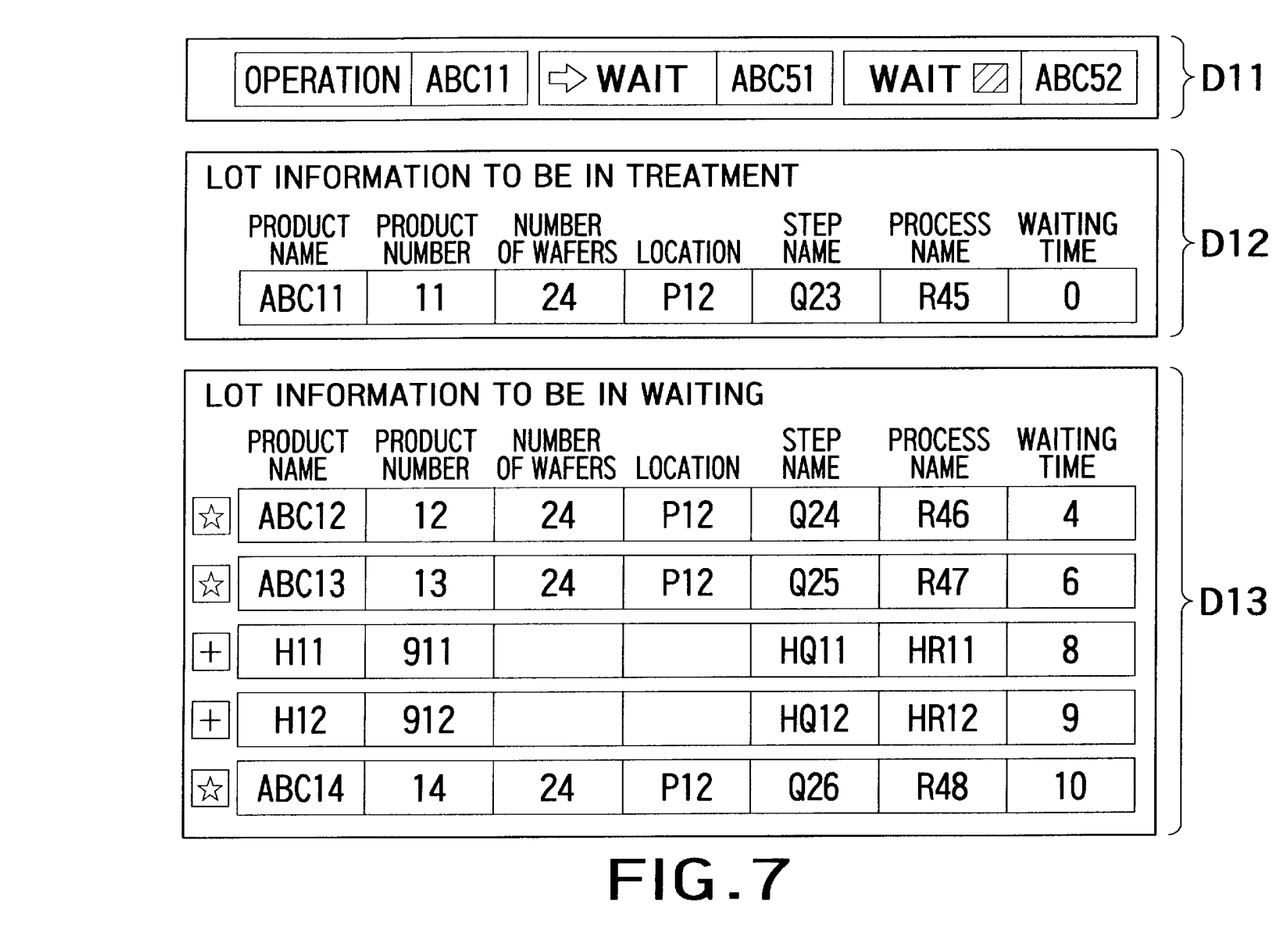
FIG. 7 is a diagram showing an example of the screen of the display apparatus in the user interface section 6 connected to each production apparatus 1.

FIGS. 6 and 7 are diagrams showing an example of the screen of the display apparatus in the user interface section 6 connected to each production apparatus 1. The screen is divided into three regions in the up and down direction. In a display region D11, operating state of the production apparatus 1 is displayed with the same form as FIG. 3. However, in this region D11, information that each apparatus control computer 4 controls is only displayed. For example, in case the apparatus management computer 4 controls only one of the production apparatus 1, operating state of only one of the production apparatus 1 is displayed in the display region D11 in FIG. 6. On the other hand, in case the apparatus management computer 4 controls a plurality of the production apparatuses 1, operating state of these production apparatuses 1 is simultaneously displayed as shown in FIG. 7.

In the display region D12 showing in FIGS. 6 and 7, information related to the lot to be in the treatment now is displayed. The displayed information is, for example, the name of the lot, the lot's number, the number of the wafers, information on the location of the production step of the lot, the name of the step, the name of the treatment, the waiting time and so on. In case the apparatus management computer 4 controls a plurality of the production apparatuses 1, when any one among a plurality of information displayed in the display apparatus D11 is clicked with the mouse and so on, information related to the lot to be in the treatment now in the clicked production apparatus 1 is displayed in the display region D12 in FIG. 7.

In the display region D13 shown in FIGS. 6 and 7, information on the lot waiting for the treatment is displayed. The contents of information displayed are almost the same as that in the display region D12; however, the mark showing the contents of the treatment is displayed in the beginning part of each line. The mark shaped like a star shows a lot waiting for the treatment for the production, and the mark shaped like a plus shows a lot waiting for the treatment for the maintenance.

It is possible to construct the hand-operated system, instead of automating all of the treatment conveying the lot. In this case, it is desirable to construct the system so that the operator can accurately and easily know the timing which loads the lot to each production apparatus 1.

Figure 8:
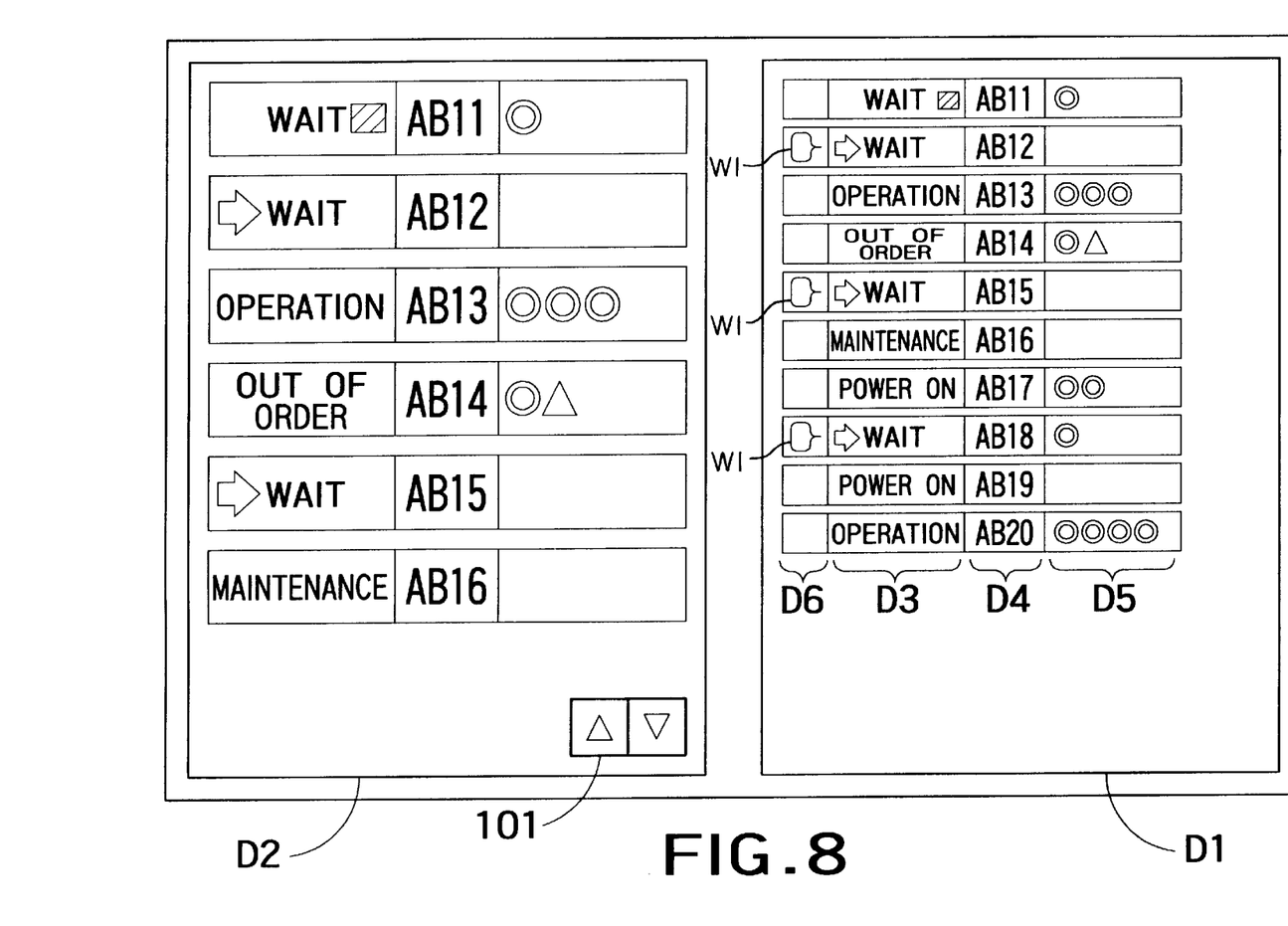
FIG. 8 is a diagram showing indicating windows displayed on the screen of each display apparatus.
Figure 9:
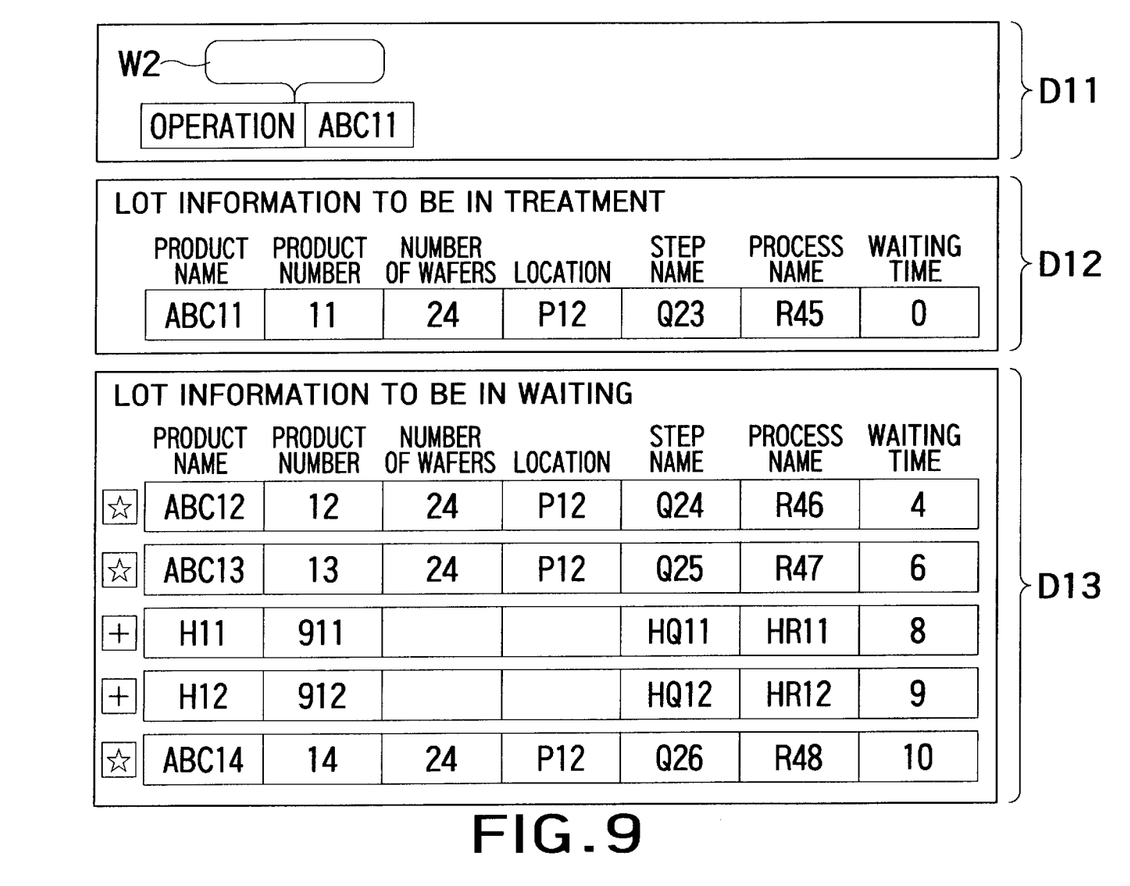
FIG. 9 is a diagram showing indicating windows displayed on the screen of each display apparatus.

Therefore, the present system intends to call the operator's attention by displaying indicating windows W1 and W2 on the screen of each display apparatus in the user interface sections 6 and 7 as shown in FIGS. 8 and 9. FIG. 8 is a diagram showing an example of the screen of the display apparatus 7a in the user interface section 7. FIG. 9 is a diagram showing an example of the screen of the display apparatus in the user interface section 6. The display region D6, in which the indicating window W1 will be displayed, is provided on the left side of the display region D3 shown in FIG. 8. The indicating window W1 is displayed in the region D6 as a need arises.

The indicating windows W1 and W2 shown in FIG. 8 and 9 are displayed when a situation which has to be immediately informed to the operator has occurred, e.g. when any trouble has occurred to the production apparatus 1 and so on, or when it is possible to load the lot.

The indicating windows W1 and W2 are displayed on the left side of the display region D3 in FIGS. 8 and on the upper part in the display region D11 in FIG. 9. The display location of the indicating windows W1 and W2 is not limited in particular.

In the above described embodiment, the production system is controlled by dividing into the lot management computer 3, the apparatus management computer 4 and the intensive management computer 5. However, the kind and number of the computers performing the control is not limited in particular. For example, it is possible to provide a host computer separately, or it is possible to perform all of the control of the system by means of only one computer.

The contents and forms displayed on the screen of the display apparatus of the user interface section 6 and 7 are not limited to be one shown in FIG. 2.

Because the present invention has a feature in which operating state of each production apparatus 1 and the degree of progress of the production process of the lot can be confirmed on the same screen, the present invention is unrelated to the number and kind of the computers.

In the above described embodiment, the example in which the lot is composed of a plurality of wafers has been explained. However, the lot can be composed of one wafer. The present invention is applicable for materials besides wafers. For example, the present invention is applicable even in case the lot is comprised of a plurality of printed boards, and parts are mounted on each printed board.

What is claimed is:

1. A production system including a plurality of production apparatuses for performing production steps and treatments in accordance with each of lots, the production system conveying each lot to said production apparatuses sequentially and performing production of semiconductor devices, comprising:
   a display control apparatus for allowing an information related to a state of each lot waiting for treatment and an information related to an operating state for each of said production apparatuses to display on the same screen of a display apparatus, said information related to the state of each lot waiting for treatment including a first mark provided corresponding to each lot waiting for treatment and a second mark showing a timing of maintenance of each production apparatus.

2. The production system according to claim 1, wherein said display control apparatus allows images and letters to display in accordance with the state of each lot waiting for the treatment, and images and letters to display in accordance with the operating state of said production apparatuses.

3. The production system according to claim 2, wherein said information related to the state of each lot waiting for the treatment includes at least images and letters showing each lot to be in waiting for the treatment, and images and letters showing said production apparatus to be in maintenance.

4. The production system according to claim 2, wherein said information related to operating state of each production apparatus includes at least one among information showing said production apparatus to be in operation, an information showing said production apparatus to be in waiting, an information showing said production apparatus to be in arrangement, an information showing what any trouble has occurred, an information showing said production apparatus to be in maintenance, an information showing said production apparatus to be in turning on, information showing said production apparatus to be in shutdown, and an information showing said production apparatus to be in lending.

5. A production system composed of a plurality of production apparatuses for performing production steps and treatments in accordance with each lot, the production system conveying each lot to said production apparatuses sequentially and performing production of semiconductor devices, comprising:
   one or a plurality of first control apparatus for setting a treatment condition in accordance with each lot to a corresponding production apparatus;
   a second control apparatus for controlling the degree of progress of the production process in each lot;
   a third control apparatus for transmitting and receiving data between said first and second control apparatuses;
   a first display apparatus controlled to display by said third control apparatus; wherein:
      said each first control apparatus outputs an information related to operating state of the corresponding production apparatus, to said third control apparatus;
      said second control apparatus outputs an information related to the state of each lot waiting for treatment in each production apparatus, to said third control apparatus;
      said third control apparatus allows an information related to an operating state for each of said production apparatuses and an information related to a state of the lots waiting for treatment for each of said production apparatuses to display on the same screen of said first display apparatus, said information related to the state of each lot waiting for the treatment including a first mark provided corresponding to each lot waiting for treatment and a second mark showing a timing of maintenance of each production apparatus.

6. A production system composed of a plurality of production apparatuses for performing production steps and treatments in accordance with each lot, the production system conveying each lot to said production apparatuses sequentially and performing production of semiconductor devices, comprising:
   one or a plurality of first control apparatus for setting treatment condition in accordance with each lot to corresponding production apparatus;
   a second control apparatus for controlling the degree of progress of the production process in each lot;
   a third control apparatus for transmitting and receiving data between said first and second control apparatuses;
   a first display apparatus controlled to display by said third control apparatus; wherein:
      said each first control apparatus outputs an information related to an operating state of the corresponding production apparatus, to said third control apparatus;
      said second control apparatus outputs an information related to the state of each lot waiting for the treatment in each production apparatus, to said third control apparatus;
      said third control apparatus allows information related to an operating state for each of said production apparatuses and information related to a state of the lots waiting for the treatment for each of said production apparatuses to display on the same screen of said first display apparatus; and
   in the screen of said first display apparatus, a first display region for displaying an information related to the operation state of all of said production apparatuses and an information related to the state of the lots waiting for the treatment in all of said production apparatuses, and a second display region for displaying with magnification one portion of the contents displayed in said first display region.

7. A production system composed of a plurality of production apparatuses for performing production steps and treatments in accordance with each lot, the production system conveying each lot to said production apparatuses sequentially and performing production of semiconductor devices, comprising:

one or a plurality of first control apparatus for setting treatment condition in accordance with each lot to corresponding production apparatus;

a second control apparatus for controlling the degree of progress of the production process in each lot;

a third control apparatus for transmitting and receiving data between said first and second control apparatuses;

a first display apparatus controlled to display by said third control apparatus; wherein:

said each first control apparatus outputs an information related to an operating state of the corresponding production apparatus, to said third control apparatus;

said second control apparatus outputs an information related to the state of each lot waiting for the treatment in each production apparatus, to said third control apparatus;

said third control apparatus allows information related to an operating state for each of said production apparatuses and information related to a state of the lots waiting for the treatment for each of said production apparatuses to display on the same screen of said first display apparatus; and in the screen of said first display apparatus, first through fourth display regions are provided with correspondence to each production apparatus;

said third control apparatus allows an information showing whether or not it is possible to load the lot in each production apparatus to each said first display region, a display operating state of each production apparatus to each said second display region, a display information showing whether or not the lot has been unloaded to each said third display region, and a display information related to the state of the lots waiting the treatment in each production apparatus to display, to each said fourth display region.

8. The production system according to claim 7, wherein in case it is possible to load the lot in each production apparatus, an arrow is displayed in said first display region.

9. The production system according to claim 7, wherein said third control apparatus allows an information related to operating state of each production apparatus, an information including at least one among information showing said production apparatus to be in operation, an information showing said production apparatus to be in waiting, an information showing said production apparatus to be in arrangement, an information showing what any trouble to have occurred, an information showing said production apparatus to be in maintenance, an information showing said production apparatus to be in turning on, an information showing said production apparatus to be in shutdown, and an information showing said production apparatus to be in lending to display, to each said second display region.

10. The production system according to claim 7, wherein said fourth control apparatus allows said information related to the state of each lot waiting the treatment to display, in which at least one of images and letters showing each lot to be in waiting for the treatment, and images and letters showing said production apparatus to be in maintenance is displayed to each said second display region.

11. The production apparatus according to claim 5, comprising:

second display apparatuses controlled to display by each first control apparatus, which are provided with correspondence to each said first control apparatus, wherein:

each of said first control apparatuses allows an information related to an operating state of the corresponding production apparatus and an information related to the state of the lots waiting for the treatment in the production apparatus to display, to said second display apparatus.

12. A production system composed of a plurality of production apparatuses for performing production steps and treatments in accordance with each lot, the production system conveying each lot to said production apparatuses sequentially and performing production of semiconductor devices, comprising:

one or a plurality of first control apparatus for setting a treatment condition in accordance with each lot to a corresponding production apparatus;

a second control apparatus for controlling the degree of progress of the production process in each lot;

a third control apparatus for transmitting and receiving data between said first and second control apparatuses;

a first display apparatus controlled to display by said third control apparatus;

second display apparatuses controlled to display by each first control apparatus, which are provided with correspondence to each said first control apparatus; and fifth through seventh display regions are provided in the screen of said second display apparatus; wherein said each first control apparatus outputs an information related to an operating state of the corresponding production apparatus, to said third control apparatus;

said second control apparatus outputs an information related to the state of each lot waiting for treatment in each production apparatus, to said third control apparatus;

said third control apparatus allows information related to an operating state for each of said production apparatuses and information related to a state of the lots waiting for treatment for each of said production apparatuses to display on the same screen of said first display apparatus; and each of said first control apparatuses allows an information showing whether or not it is possible to load the lot in said production apparatuses to display, to said fifth display region, and an information showing whether or not the lot has been unloaded from the corresponding production apparatus to display, to said seventh display region.

13. The production apparatus according to claim 12, wherein in case it is possible to load the lot in each production apparatus, said first control apparatus allows an arrow in said fifth display region to display.

14. The production system according to claim 12, wherein said first control apparatus allows an information related to an operating state of each production apparatus, an information including at least one among information showing said production apparatus to be in operation, an information showing said production apparatus to be in waiting, an information showing said production apparatus to be in arrangement, an information showing what any trouble has occurred, an information showing said production apparatus to be in maintenance, an information showing said production apparatus to be in turning on, an information showing said production apparatus to be in shutdown, and an information showing said production apparatus to be in lending to display, to said sixth display region.

15. The production system according to claim 12, wherein:

an eighth display region is provided in the screen of said second display apparatus; and each of said first control apparatuses allows a detailed information related to the lot to be in treating now to display, to said eighth display region.

16. The production system according to claim 15, wherein said first control apparatus allows detailed information related to the lot to be in treating now, an information including at least one among the product's name of the lot to be in treating now, the product's number, the number of the wafers, the location of the production step, the name of the production step, the name of the treatment, and the waiting time to display, to said eighth display region.

17. The production system according to claim 12, wherein:
- a ninth display region is provided in the screen of said second display apparatus; and
- each said first control apparatus allows an information related to the state of each lot waiting for the treatment in the corresponding production apparatus to display, to said ninth display region.

18. The production system according to claim 17, wherein said first control apparatus allows a detailed information related to the lot to be in treating now, information including at least one among the product's name of the lot to be in treating now, the product's number, the number of the wafers, the location of the production step, the name of the production step, the name of the treatment, and the waiting time to display, to said ninth display region.

19. The production system according to claim 18, comprising:
- a tenth display region provided with correspondence to each said production apparatus in the screen of said first display apparatus; wherein
  - in case a situation that it is necessary to let the operator know what has occurred, said third production apparatus allows prescribed information to display to said tenth display region corresponding to said production apparatus.

20. The production system according to claim 11, wherein:
- a first display region is provided in the screen of said second display apparatus;
- in case a situation that it is necessary to let the operator know what has occurred, each of said first control apparatuses allows prescribed information to display to said first display region.

21. The production system according to claim 5, wherein:
- said lot is comprised by a plurality of wafers;
- each of said first production apparatus forms a semiconductor circuit based on the condition of the treatment prescribed at each lot.

22. A production system including a plurality of production apparatuses for performing production steps and treatments in accordance with each of lots, the production system conveying each lot to said production apparatuses sequentially and performing production of semiconductor devices, comprising:
- a conveyer configured to convey each lot to any of said production apparatuses;
- a lot management part configured to control a destination for conveying each lot;
- a conveyer controller configured to control said conveyer based on said lot management parts; and
- a display control apparatus for allowing an information related to a state of each lot waiting for treatment and an information related to operating state of said production apparatus to display on the same screen of a display apparatus, said information related to the state of each lot waiting for treatment including a first mark provided corresponding to each lot waiting for treatment and a second mark showing a timing of maintenance of each production apparatus.

* * * * *